US012304097B2

(12) United States Patent
Cheng et al.

(10) Patent No.: US 12,304,097 B2
(45) Date of Patent: May 20, 2025

(54) RETRACTABLE UTILITY KNIFE

(71) Applicant: Allway Tools, Inc., West Babylon, NY (US)

(72) Inventors: Yuan Fang Cheng, Syosset, NY (US); Donald Gringer, New York, NY (US)

(73) Assignee: ALLWAY TOOLS, INC., West Babylon, NY (US)

(*) Notice: Subject to any disclaimer, the term of this patent is extended or adjusted under 35 U.S.C. 154(b) by 337 days.

(21) Appl. No.: 17/643,397

(22) Filed: Dec. 8, 2021

(65) Prior Publication Data

US 2022/0266461 A1 Aug. 25, 2022

Related U.S. Application Data

(60) Provisional application No. 63/089,427, filed on Oct. 8, 2020.

(51) Int. Cl.
*B26B 5/00* (2006.01)
*B25G 1/08* (2006.01)

(52) U.S. Cl.
CPC ................ *B26B 5/003* (2013.01); *B25G 1/08* (2013.01); *B26B 5/005* (2013.01)

(58) Field of Classification Search
CPC ............ B26B 5/003; B26B 5/005; B25G 1/08
See application file for complete search history.

(56) References Cited

U.S. PATENT DOCUMENTS 6,058,607 A * 5/2000 Gringer .................. B26B 5/003 30/162
6,263,577 B1 * 7/2001 Wonderley ............. B26B 5/003 30/162
6,832,438 B1 * 12/2004 Gringer .................. B26B 5/003 30/162
8,375,588 B2 * 2/2013 Gringer .................. B26B 5/001 30/162
8,938,883 B2 1/2015 Gringer et al.
9,102,068 B2 * 8/2015 Gringer .................. B26B 5/003
2006/0130340 A1 * 6/2006 Berns ..................... B26B 5/003 30/162
2009/0277016 A1 * 11/2009 Wu ........................ B26B 5/003 30/162
2010/0269348 A1 * 10/2010 Gringer .................. B26B 5/001 30/2
2011/0035947 A1 * 2/2011 Rohrbach ............... B26B 5/003 30/162

(Continued)

FOREIGN PATENT DOCUMENTS

GB 2538280 A * 11/2016 ............... B26B 1/08
JP 2005046539 A * 2/2005
WO WO-2014125004 A1 * 8/2014 ............ B26B 5/003

OTHER PUBLICATIONS

JP2005046539 Translation (Year: 2005).*
WO2014125004 (Year: 2014).*

*Primary Examiner* — Jonathan G Riley
(74) *Attorney, Agent, or Firm* — Gottlieb, Rackman & Reisman, PC

(57) ABSTRACT

An automatically retractable knife that includes an actuator, a blade carrier, two springs, a pawl and a blade. The knife is configured with a safety feature to ensure that the knife blade is automatically retractable upon completion of cutting a surface.

15 Claims, 11 Drawing Sheets

(56) References Cited

U.S. PATENT DOCUMENTS

| | | | | |
|---|---|---|---|---|
| 2012/0102756 | A1* | 5/2012 | Garavaglia | B26B 5/00 30/151 |
| 2014/0013605 | A1* | 1/2014 | Wu | B26B 5/003 30/162 |
| 2019/0015996 | A1* | 1/2019 | Dechant | B26B 5/00 |

* cited by examiner

FIG. 38
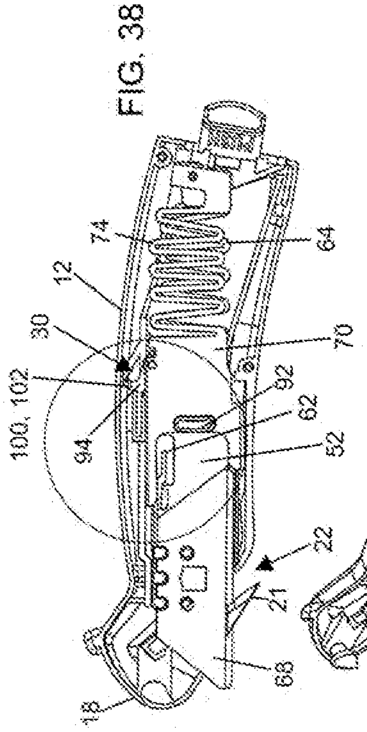
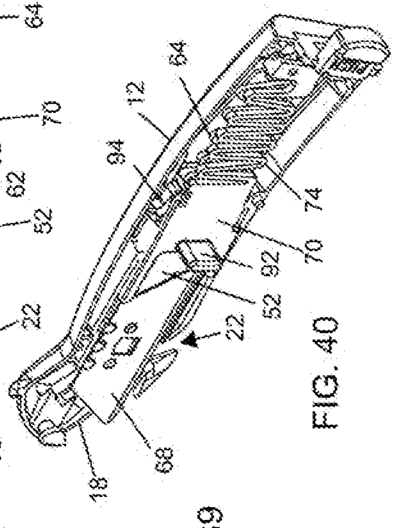
FIG. 40
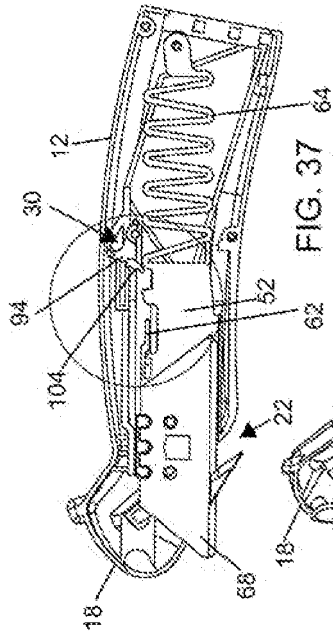
FIG. 37
FIG. 39
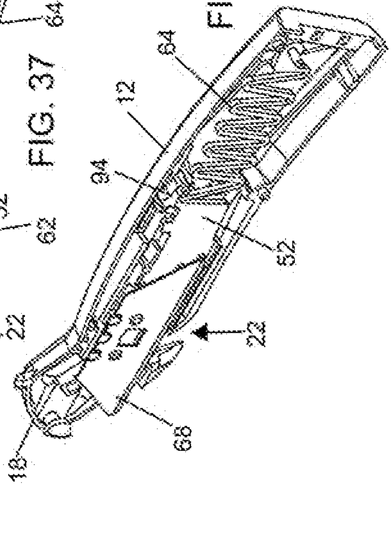

RETRACTABLE UTILITY KNIFE

CROSS-REFERENCE TO RELATED APPLICATION

This patent application claims benefit to U.S. Provisional Patent Application No. 63/089,427, filed Oct. 8, 2020, which is hereby incorporated by reference in its entirety as part of the present disclosure.

FIELD OF THE INVENTION

The present invention relates generally to cutting implements and more specifically to an automatically retractable utility knife.

BACKGROUND OF THE INVENTION

In general, knives that include a blade attached to a handle are well known. Such forms of knives include, for example, fixed blade knives, utility knives, safety knives, folding knives and the like.

Originally, non-foldable knives were designed with a blade attached permanently to a handle. Such knives are commonly referred to as a fixed blade or a straight blade knife. These knives typically include a protective sheath (e.g., thick leather) to cover the exposed blade when not in use. However, fixed blade knives have many drawbacks. For example, the knife blade can become an inadvertent cutting hazard when the knife is not in use if the sheath is misplaced or damaged, these knives are bulky due to the combined length of the handle and a non-foldable blade that extends from the handle and the blade requires sharpening, as needed, when the blade becomes dull because it cannot be replaced.

Knives then evolved to what are commonly referred to as utility knives. These knives include a removable blade. The blade is arranged between separable halves of a handle with a portion of the blade extending from the knife and the halves held in place by a fastener (e.g., screw). When the blade became dull, the fastener is loosened and the portion of the blade that was previously orientated to be arranged within the handle is rotated to extend from the handle and the portion of the blade that is dull is arranged within the handle or, if the entire blade is dull, the blade can be replaced.

The utility knife can include a slider that has a button that can be pushed to extend or retract the blade to make the knife safer. The slider, which typically was made of steel, is now commonly made of a polymer (e.g., Delrin®) to prevent the stored end of the blade in the housing from contacting the carrier (commonly made of steel) and over time causing the blade to become dull due to contact between the blade and the handle.

Knives and blades have evolved such that blades that are used in conjunction with knifes are shorter to allow blades to cut through an object, but not too far (e.g., cut through a box but not damage the merchandise inside) and knives are configured to allow the blades to extend therefrom and automatically retract therein to prevent injuries. These knives commonly include a polymer (e.g., Delrin® or Celcon®) slider to act as a one-piece blade carrier, retractable spring and a handle locking latch with the replaceable blades modified with rounded points to prevent piecing accidents. Typically, when cutting a surface, the friction of the surface holds the blade in an extended state. However, when a user is finished cutting the surface and friction no longer exists, the blade can automatically retract within the handle. This is commonly done where a spring retracts automatically when pressure is no longer applied to the slider tab. These knives are called commonly referred to as "safety knives." However, such knives can be dangerous if a user holds his/her hand on the button causing the blade to remain extended after as desired cut is finished.

For safety considerations, the utility knife was further improved so that the blade automatically retracts or vanishes after a cut is made to a surface even though a user is still applying pressure to a protrusion associated with the slider that holds the blade in place within the knife body. While these utility knives further improved safety aspects of using a utility knife, many knives that have been developed to automatically retract have several drawbacks. For example, such knives are commonly bulky because they are manufactured with several components, including three coil springs, susceptible to the collection debris which can in turn prevent full extension or retraction of the knife blade and/or result in an inferior cut to a surface or possible injury to a user and their design can make it challenging to view the surface the blade is cutting.

SUMMARY OF THE INVENTION

The present disclosure is directed to a knife that is configured to automatically retract upon completion of using the knife.

In an embodiment, the present disclosure is broadly directed to a knife that comprises a housing, an actuator arranged within the housing that including a main body that has a first spring that extends therefrom and an opening formed therein, a blade carrier that includes a carrier body arranged within and extending from the opening of the actuator and has a spring extending therefrom and a pawl fixed to the actuator. A blade can be arranged between the first flange and the second flange of the blade carrier and the knife can be constructed of at most five parts.

The housing can include a first body portion and a second body portion. The first body portion can include a plurality of projections that forms a first ramp and the second body portion can include a plurality of projections that forms a second ramp that is mirror opposite the first ramp The first body portion can include an extension that defines a stop which is configured to interact with the pawl.

The first spring and the second spring can be extension springs.

The actuator, the blade carrier and the pawl can be comprised of a plastic.

The blade carrier can include a first flange extending from a first outer periphery of the carrier body and second flange extending from a second outer periphery of the carrier body. The blade carrier can include an elastically deformable protrusion that extends from the carrier body. The blade carrier can include an elastically deformable protrusion extending therefrom that is configured to interact with the pawl.

The pawl can include a pawl body and a head extending from the pawl body, a first protrusion extending from the pawl head in a first direction, a second projection extending in a second direction that opposite the first direction from the pawl head and a hook-like projection extending from the pawl body.

In another embodiment, the present disclosure is directed to a method of using the knife that comprises the following steps: providing a housing, an actuator arranged within the housing that including a main body that has a first spring that extends therefrom and an opening formed therein, a blade carrier that includes a carrier body arranged within and extending from the opening of the actuator and has a spring extending therefrom and a pawl fixed to the actuator; contacting a button extending from the knife; pressing the button in a forward direction which in turn causes the actuator and the blade carrier along with a blade arranged on the blade carrier to move in the forward direction and the pawl to rotate direction; continuing to press the button in the forward direction until the pawl contacts a protrusion extending from the housing; releasing pressure on the button which in turn disengages the pawl from the blade carrier; contacting a surface with the blade which in turn causes the blade to extend outwardly to a fully extended position along with the blade carrier; and completing a cut with the blade and removing the blade from the surface causing the blade and blade carrier to automatically retract.

BRIEF DESCRIPTION OF THE DRAWINGS

FIGS. 37-40 are various views of the first body portion of FIGS. 1A and 1B depicting the blade in a fifth position whereby the blade and blade carrier are fully extended without the support of the pawl and the actuator and pawl are retracting toward the first position according to an exemplary embodiment of the present disclosure.

DETAILED DESCRIPTION OF EMBODIMENTS OF THE INVENTION

With reference now to the drawings, and in particular to FIGS. 1 through 40, embodiments of automatically retractable knife of the present disclosure will be described.

Figure 3:
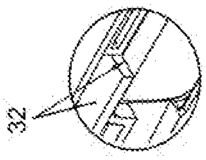
FIG. 3 is a detail view of a stop or edge limit extending from the first body portion from FIG. 1B according to an exemplary embodiment of the present disclosure.
Figure 1B:
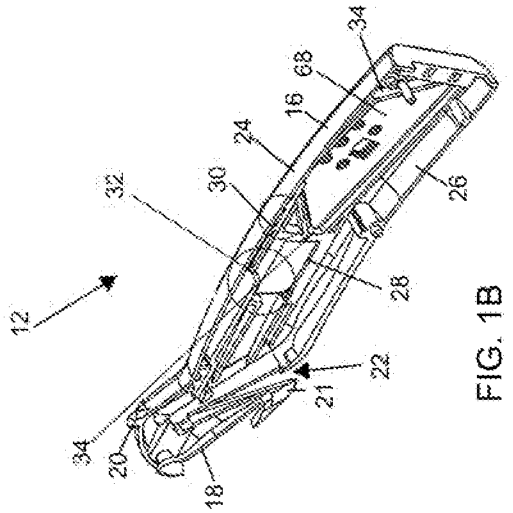
FIGS. 1A and 1B are a perspective views of a first body portion of a multi-function utility knife according to an exemplary embodiment of the present disclosure.
Figure 1A:
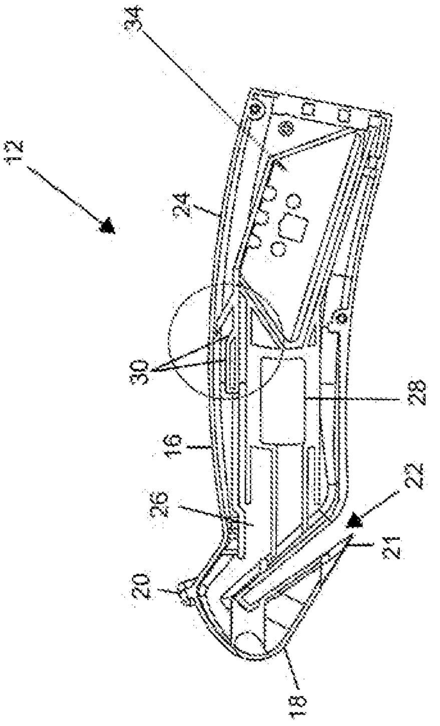
Figure 2:
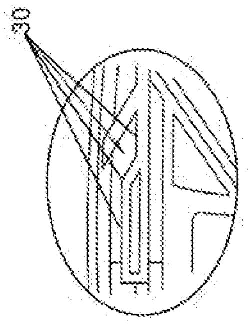
FIG. 2 is a detail view of a ramp from FIG. 1A according to an exemplary embodiment of the present disclosure.
Figure 4B:
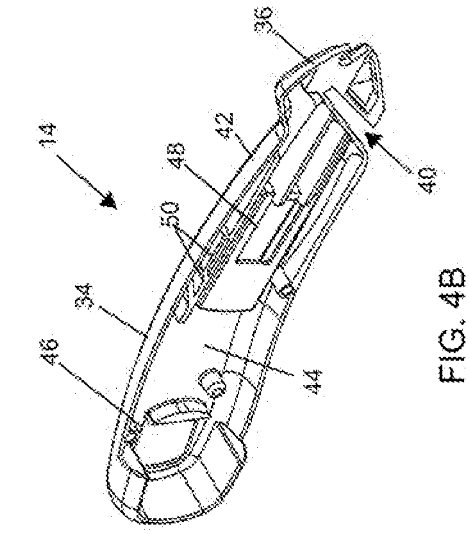
FIGS. 4A and 4B are a perspective views of a second body portion of the multi-function utility knife according to an exemplary embodiment of the present disclosure.
Figure 4A:
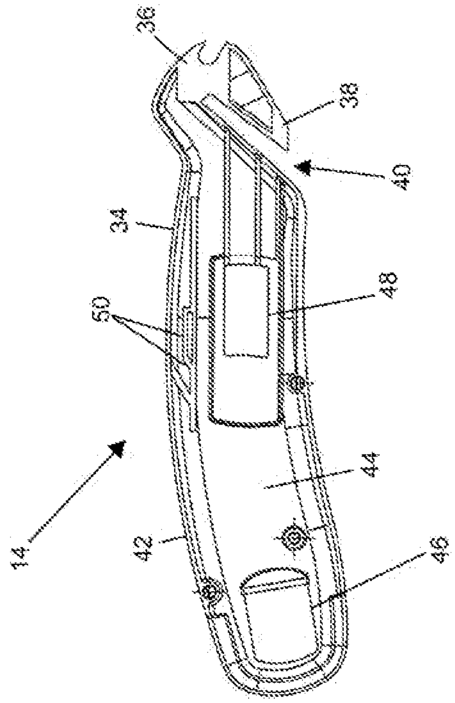

The automatically retractable knife includes a handle or housing that is comprised of a first body portion 12 as shown in FIGS. 1A and 1B and a second body portion 14 as shown in FIGS. 4A and 4B. The body portions 12, 14 can be comprised, for example, of an engineered plastic, polymer, metal or a metal alloy. The various internal mechanism and features of the knife will be described below.

As depicted in FIGS. 1A and 1B, the first body portion 12 includes a first housing member 16 from which a first head or nose 18 extends. The first head 18 includes a protrusion or nib 20 that extends from the first head 18 and that is configured to score a container (e.g., corrugated board) without damaging the contents of the container. The first head 18 further includes a hook 21 and first cavity 22 that extends from an outer periphery of the first head 18 inwardly and across which a blade, in an installed state, extends. The hook 21 allows a user to orientate the knife into stretch film covered pallets and slice it open without cutting the carton or merchandise within and the cavity 22 aids to cut, for example, nylon strapping by arranging the strapping in the cavity 22 and pulling at an acute angle.

The first body portion 12 further includes an external surface 24 and an internal surface 26 with a first opening 28 extending therebetween. Protruding from the internal surface 26 of the first body portion 12 is a first ramp 30 (see also FIG. 2) that is defined by a plurality of projections, a first edge or stop 32 (see also FIG. 3) defined by an extension of one of the first plurality of projections and blade storage 34 configured to store extra blades.

The second body portion 14 as depicted in FIGS. 4A and 4B includes a second housing member 34 from which a second head or nose 36 extends. The second head 36, in combination with the first head 18 in an assembled state is configured to score a container (e.g., corrugated board) without damaging the contents of the container. The second head 36 further includes a hook 38 and second cavity 40 that extends from an outer periphery of the second head 36 inwardly and across which a blade, in an installed state, extends. The hook 38, in combination with the hook 21 of the first body portion 12 in an assembled state allows a user to orientate the knife into stretch film covered pallets and slice it open without cutting the carton or merchandise within and the cavity 22, 40 aids to cut, for example, nylon strapping by arranging the strapping in the cavity 22, 40 and pulling at an acute angle.

The second body portion 14 further includes an external surface 42 and an internal surface 44 with a second opening 46 and a third opening 48 extending therebetween. Protruding from the internal surface 44 of the second body portion 14 is a second ramp 50 that is identical to the ramp 30 of the first body portion 12 and similarly defined by a plurality of projections.

Figure 6:
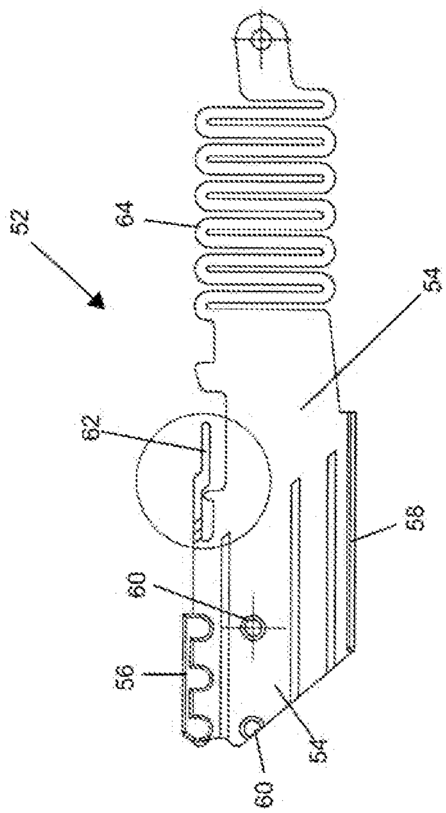
FIGS. 5 and 6 are views of a blade carrier according to an exemplary embodiment of the present disclosure.
Figure 8:
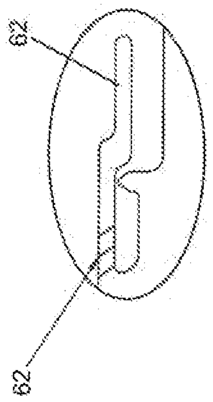
FIGS. 7 and 8 are detail views of FIGS. 5 and 6, respectively, of an elastically deformable protrusion of the blade carrier of according to an exemplary embodiment of the present disclosure.
Figure 5:
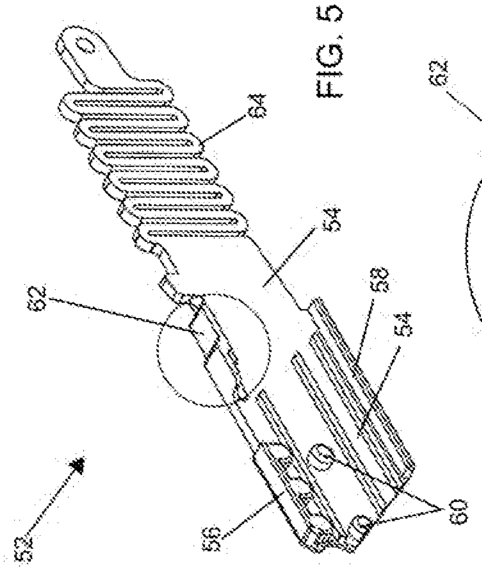
Figure 7:
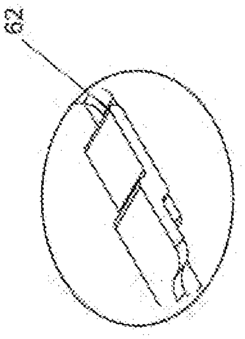

A one-piece blade carrier 52, as depicted in FIGS. 5 and 6, includes a main body 54 that has a first flange 56 and a second flange 58 between which at least one projection 60 extends, an elastically deformable protrusion 62 (see also FIGS. 7 and 8) and a spring 64 extending directly from a distal end 66 of the blade carrier 52. The blade carrier 52 can be comprised, for example, of a polymer such as DERIN® or CELCON®, a metal or an alloy. A blade 68 (see FIGS. 14 and 15) can be arranged in contact with the main body 54, between the first flange 56 and the second flange 58 with the projection(s) 60 extending through the blade 68 to further aid in fixing the blade on the blade carrier 52. In a first or resting state, the spring 64 is in a contracted position as shown. In a second or use state, the spring 64 is extendable so that the blade carrier 52 can move toward a front end of the knife as will be explained in detail below, allowing the blade 68 to extend outwardly from said front end.

Figure 10:
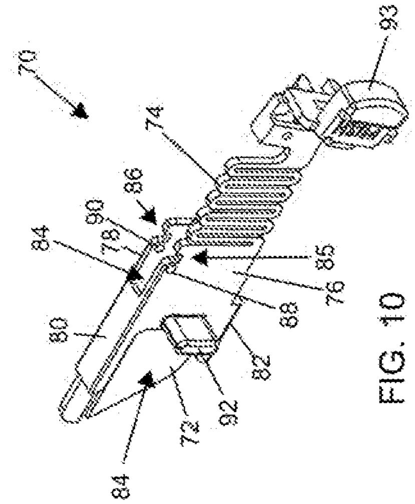
FIGS. 9 and 10 are views of an actuator according to an exemplary embodiment of the present disclosure.
Figure 9:
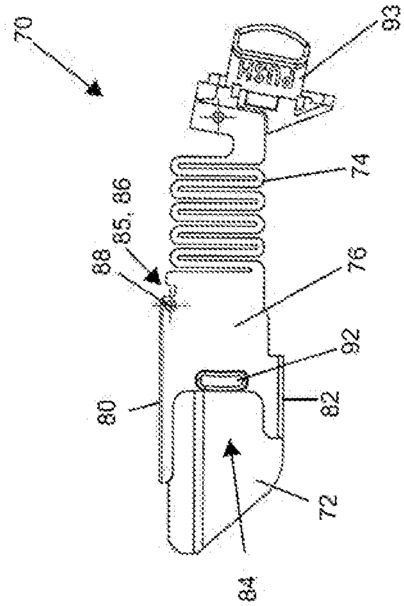

FIGS. 9 and 10 illustrate an actuator 70 that is arranged between the first body portion 12 and the second body portion 14. The actuator 70 includes an actuator body 72 from which a second spring 74 extends. In a first or resting state, the spring 74, like the spring 64 of the blade carrier 52, is in a contracted position as shown. In a second or use state, the spring 74 is extendable so that the actuator 70 can move toward a front end of the knife as will be explained in detail below. The actuator body 72 is comprised of a first sidewall 76, a second sidewall 78 that is spaced from the first sidewall 76, a top wall 80 extending between the first and second sidewalls 76, 78 at a first end of the first and second sidewalls 76, 78 and a bottom wall 82 extending between the first and second sidewalls 76, 78 at a second end of the first and second sidewalls 76, 78. Together the sidewalls 76, 78, 80, 82 form a cavity or opening 84 within the actuator body 72 in which the blade carrier 52 is arranged and extends and moveable therein. The first and second sidewalls 76, 78 each have a recess 85, 86 that are aligned with each other and a hole 88, 90 that extend through the first sidewall 76 and second sidewall 78, respectively, and are also aligned with each other. A first button 92 extends from the first sidewall 76 and, in an assembled state extends through the opening 28 between the external surface 24 and an internal surface 26 of the first body portion 12, and a second button 93 extends from a distal end of the actuator 70 through the opening 46 in an assembled state to aid separating the first and second body portions 12, 14, as needed. It is noted that another button (not shown) extends from the second sidewall 78 mirror opposite and identical to the first button, through the third opening 48 to allow for left-handed use of the knife.

Figure 12:
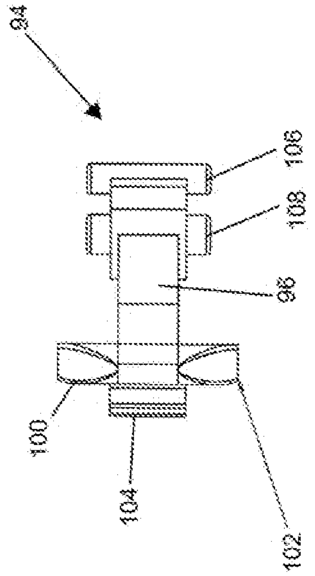
FIGS. 11-13 are various views of a pawl that interacts with the actuator FIGS. 9 and 10 and the blade carrier of FIGS. 5 and 6 according to an exemplary embodiment of the present disclosure.
Figure 13:
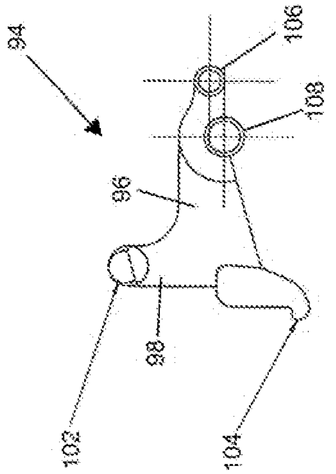
Figure 11:
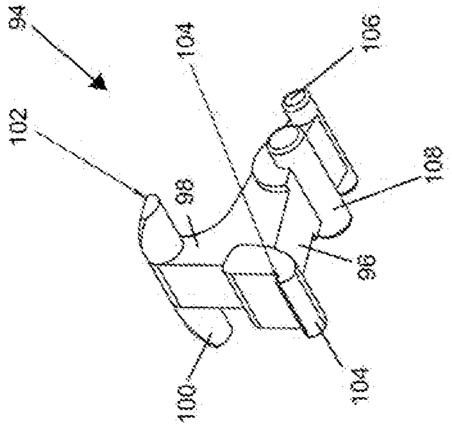
Figure 14:
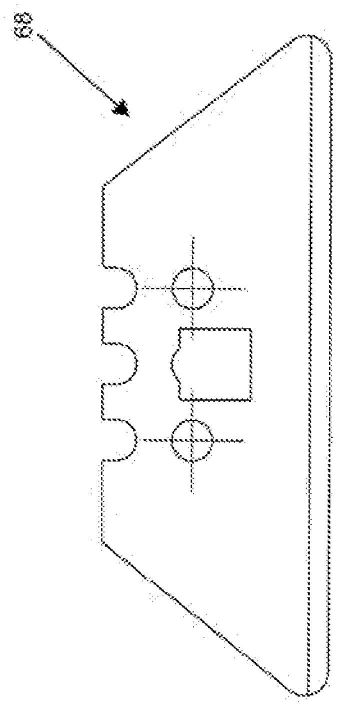
FIGS. 14 and 15 are views of a blade that is arranged on the blade carrier of FIGS. 5 and 6 according to an exemplary embodiment of the present disclosure.
Figure 15:
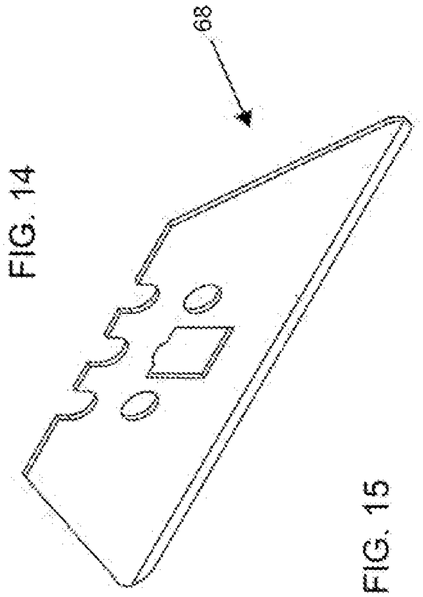

FIGS. 11-13 depict various views of a pawl 94. The pawl 94, which can be comprised, for example of a polymer such as DELRIN®, CELCON®, a die casting or the like, includes a body 96 from which a head 98 extends. A first and a second projection 100, 102, respectively, which are parallel to each other, extend in opposite directions from the head 98 and are configured to slide along the ramps 30, 50 in a forward and reward direction. A projection 104 forming hook or curved extension is located at a lower front end of the pawl body 96. The projection 104 is configured to interact with the elastically deformable projection 62 of the blade carrier 52. A first pin 106 extends from a lower rear end of the body 96 that is configured to be arrangeable in the recesses 84, 86 of the actuator 70. A second pin 108 extend outwardly from the body 96 of the pawl 94 near the first pin 106. The second pin 108 is configured to be arranged within the hole 88 of the first sidewall and the hole 90 of the second sidewall 78 of the actuator 70 to fix the pawl 94 to the actuator 70 and allow for rotation of the pawl 94.

FIGS. 16-19 are various views that show the actuator 70 and the blade carrier 52 arranged within first body portion 12. It is noted for these figures and all subsequent figures that the second body portion 14 has been removed for simplicity and to allow for a better understanding of the internal mechanism of the knife. The actuator 70 and the blade carrier 52 as shown in FIGS. 16-19 are in a first, retracted state with the pawl 94, and in particular the first projection 100 and the second projection 102 thereof, is arranged at the base of the ramps 30, 50, respectively, and the blade 68 positioned such that it does not extend outwardly beyond the head 18 of the first body portion 12. However, even in a retracted state, the blade 68 can be used to cut, for example, strapping as the blade 68 extends across the channel 22 of the first housing member 11 (and the channel 40 of the second body portion 14).

Figure 21:
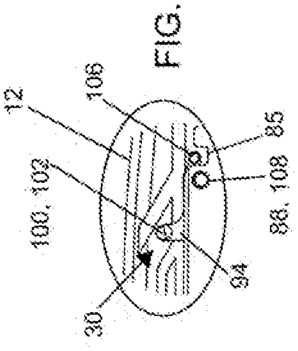
FIG. 21 is a detail view of FIG. 17 showing the pawl arranged at a base of the ramp of the first body portion according to an exemplary embodiment of the present disclosure.
Figure 17:
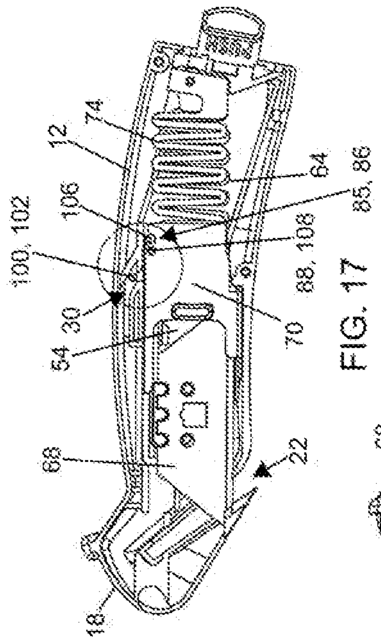
FIGS. 16-19 are various views of the first body portion of FIGS. 1A and 1B depicting the blade of FIGS. 14 and 15 in a first, retracted position according to an exemplary embodiment of the present disclosure.
Figure 19:
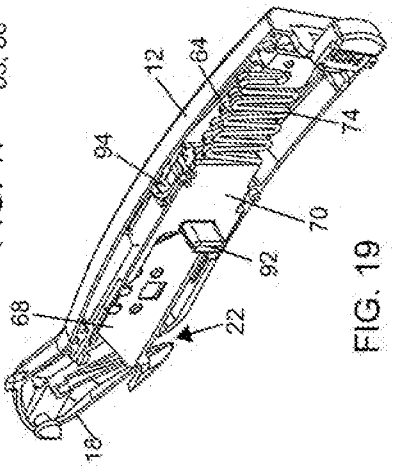
Figure 16:
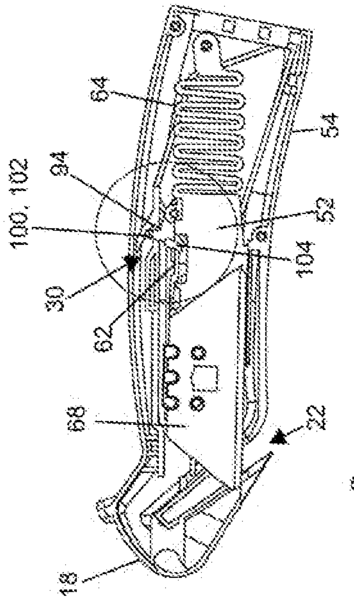
Figure 18:
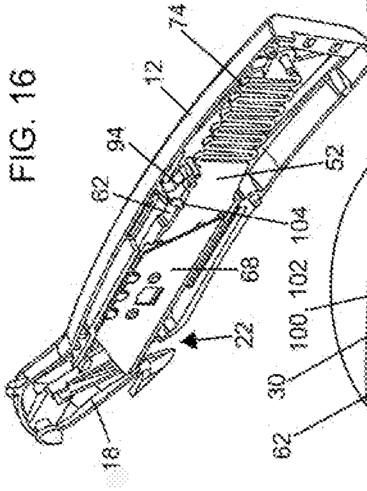
Figure 20:
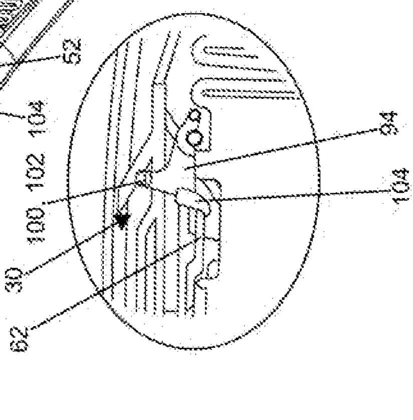
FIG. 20 is a detail view of FIG. 16 showing the pawl arranged at a base of the ramp of the first body portion according to an exemplary embodiment of the present disclosure.
Figure 23:
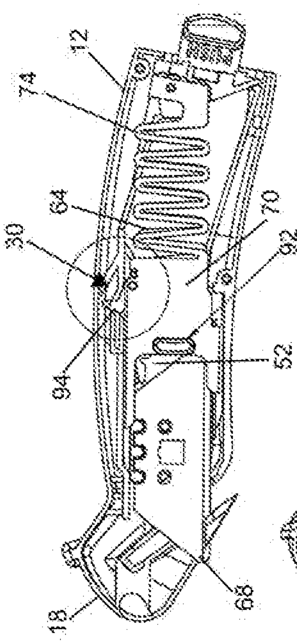
FIGS. 22-25 are various views of the first body portion of FIGS. 1A and 1B depicting the blade in a second, partially extended position according to an exemplary embodiment of the present disclosure.
Figure 25:
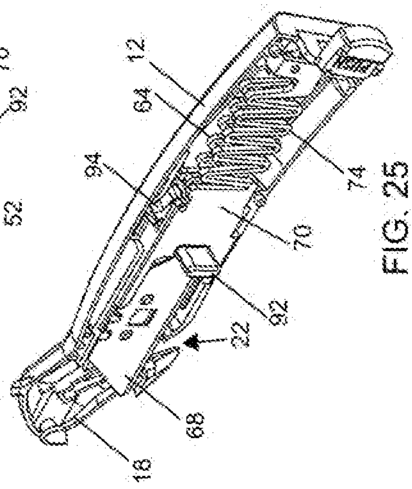

FIGS. 20 and 21 further depict details of the pawl 94 with respect to the ramp 30 in the first, retracted state. As shown in FIG. 20, in the first, retracted state, the projection 104 is orientated to extend beneath and contact the projection 62 of the blade carrier 52. The second pin 108 is arranged within the holes 88, 90 of the actuator 70, fixing the pawl 94 to the actuator 70 and allow for rotation of the pawl 94. The first pin 106 is orientated within the recesses 84, 86 of the actuator 70.

FIGS. 22-25 are various views that show when pressure is applied to the button 92 the knife is in a second, partially extended state. This occurs because due to the pressure on the button 92, the actuator 70 moves in a forward direction causing the pawl 94 to begin to rotate clockwise and as a result, the first projection 100 and the second projection 102 of the pawl 94 to travel in a forward direction about the ramps 30, 50 and lift or elastically deforming the projection 62 of the blade carrier 52 which in turn causes he blade carrier 52 to move in the forward direction as well. As the blade carrier 52 moves in the forward direction, the blade 68 that is arranged on the carrier 52 begins to extend outwardly, beyond the head of the knife.

Figure 22:
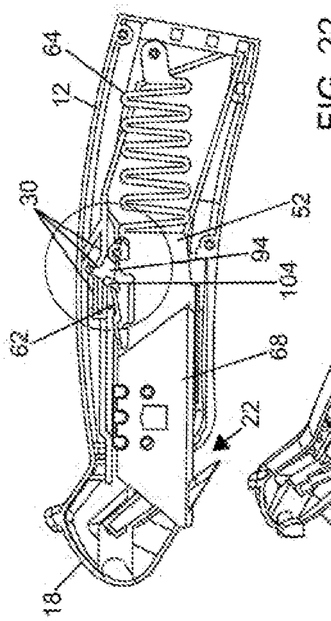
Figure 24:
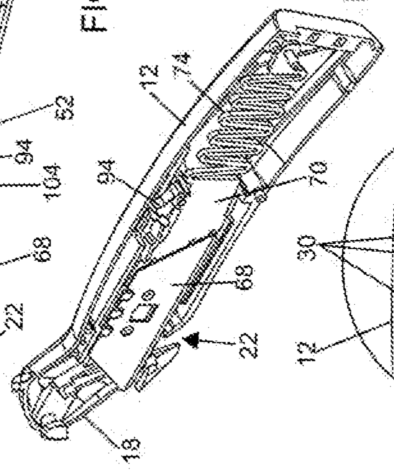
Figure 26:
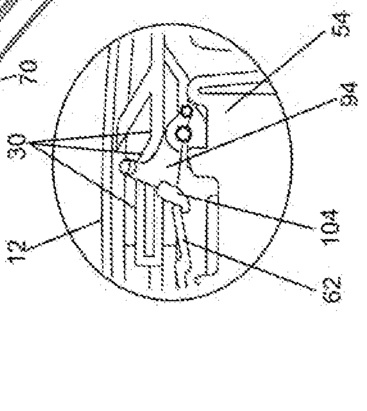
FIG. 26 is a detail view of FIG. 22 showing the pawl in a forward position moving along the ramp of the first body portion according to an exemplary embodiment of the present disclosure.
Figure 28:
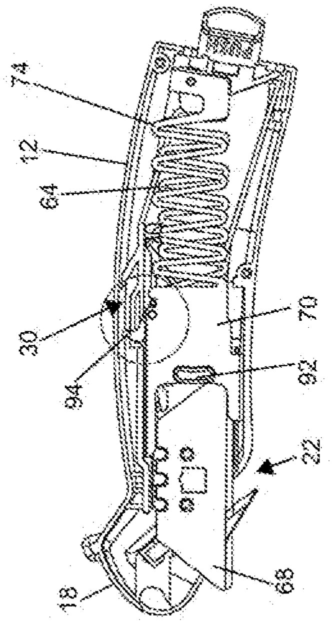
FIGS. 27-30 are various views of the first body portion of FIGS. 1A and 1B depicting the blade in a third, fully extended position according to an exemplary embodiment of the present disclosure.
Figure 30:
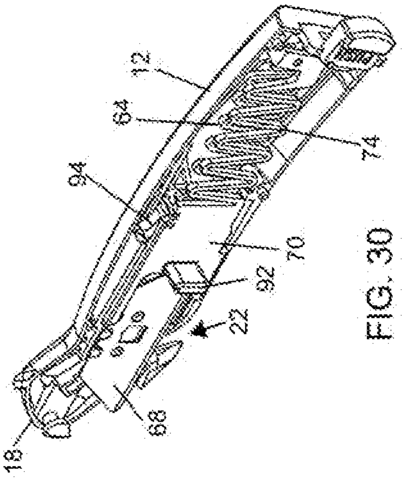

FIG. 26 is a detail view of FIG. 22 showing the pawl 94 rotating in the clockwise direction, moving forward about the ramp 30 and contacting the protrusion 62 of the blade carrier 52 from beneath the protrusion 62 and lifting the protrusion 62 to allow the blade carrier 52 and in turn blade 68 to move in the forward direction.

FIGS. 27-30 are various views showing the knife in a third, fully extended state. As seen in the figures, in the fully extended state, the pawl 94 is in contact with the edge limit or stop 32 of the first body portion 12. Once the pawl 94 contacts the stop 32, the pawl 94 and the actuator 70 cannot move in the forward direction any further.

Figure 27:
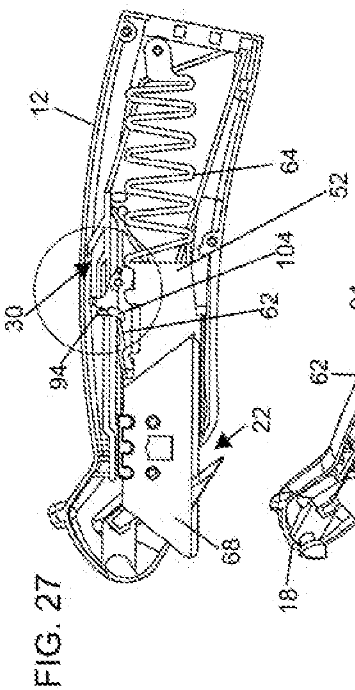
Figure 29:
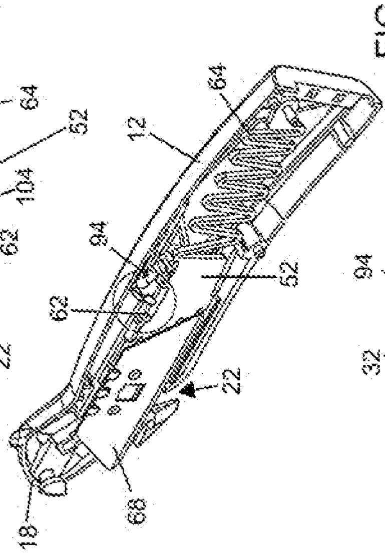
Figure 31:
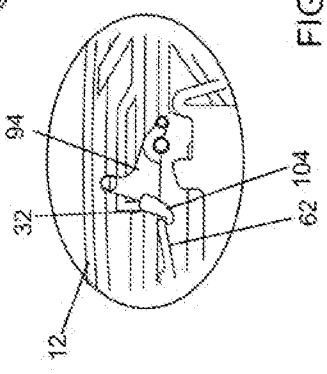
FIG. 31 is a detail view of FIG. 27 showing the pawl in a forward position at the top of the ramp and contacting the stop of the first body according to an exemplary embodiment of the present disclosure.
Figure 33:
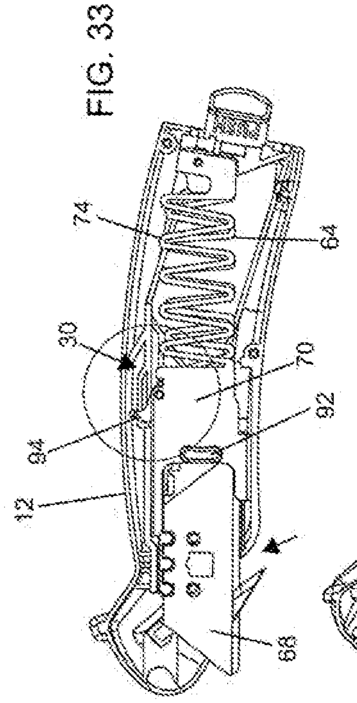
FIGS. 32-35 are various views of the first body portion of FIGS. 1A and 1B depicting the blade in a fourth position whereby the blade and carrier are fully extended without the support of the pawl and the actuator such that upon completion of cutting a surface and no pressure being applied to the blade by the surface, the blade carrier and in turn blade will automatically retract to the first position according to an exemplary embodiment of the present disclosure.
Figure 35:
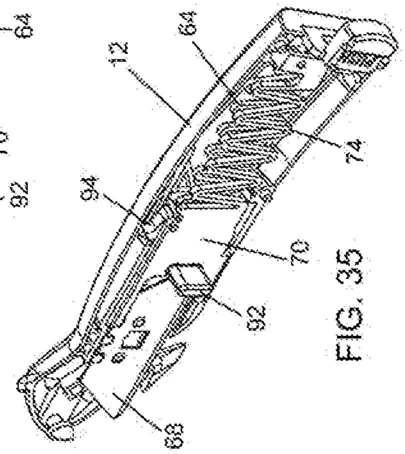

FIG. 31 is a detail view of FIG. 27 showing the pawl 94 in a forwardmost position, contacting the stop or edge limit 32 of the first body portion 12 which prohibits further forward movement of the actuator 70, pawl 94 and in turn the blade carrier 52 and blade 68.

FIGS. 32-35 various views showing the blade 68 and blade carrier 52 in a fourth, fully extended state. Here, when the blade contacts a surface to be cut, the surface exerts a force and the torque a surface on the blade, pulling the blade 68 and in turn blade carrier 52 forward to a fully extended state without the support of the actuator 70 or the pawl 94. As the blade carrier 52 moves forward while the actuator 70 and the pawl 94 remain in place, the protrusion 62 of the carrier 52 becomes disengaged from the protrusion 104 of the pawl 94 and returns to a first non-deformed resting state.

Figure 32:
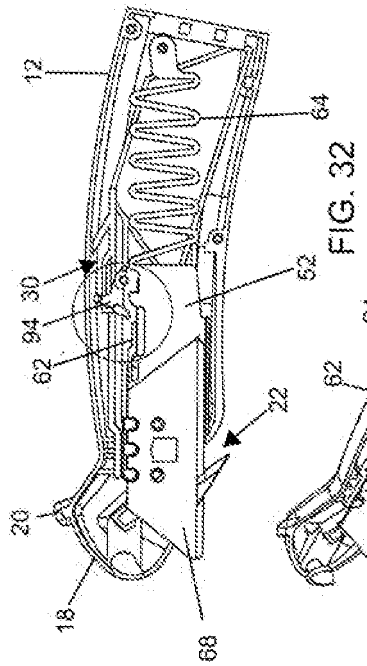
Figure 34:
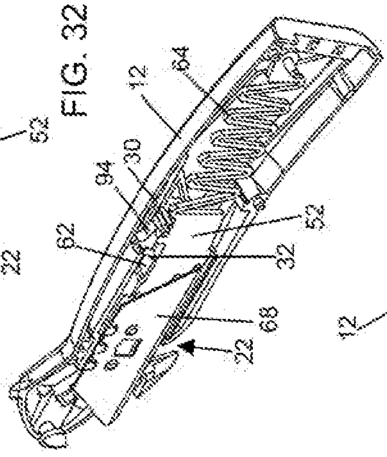
Figure 36:
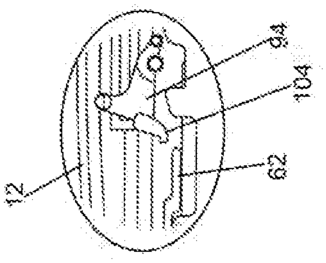
FIG. 36 is a detail view of FIG. 32 showing the pawl disengaged from the blade carrier according to an exemplary embodiment of the present disclosure.

FIG. 32 is a detail view of FIG. 36. As can be seen in FIG. 38, the pawl 94 is disengaged from the protrusion 62 of the blade carrier 52 and the protrusion 62 has returned to the first non-deformed resting state.

FIGS. 37-40 are various views of the knife in fifth state. Once the knife is in contact with a surface and is being used to cut said surface, the user can release the button 92 of the actuator 70 which will automatically retract the actuator 70, the pawl 92 and the spring 74 to an initial first position. Once the user is done cutting a desired surface, the user can move the knife away from the surface. When the knife is moved away from the surface, the blade 68 is no longer held in the fully extended position by the surface that was being cut. As such, the blade 68, the blade carrier 52 and the spring 64 will retract automatically to the initial, first position without the user having to slide the button 92 toward an initial retracted state and in turn aid to prevent possible injuries. Thus, the knife eliminates the user from having to retract the blade manually.

The accompanying drawings illustrate exemplary embodiments of a knife and its respective constituent parts, however, other types and styles are possible, and the drawings are not intended to be limiting in that regard. Thus, although the description above and accompanying drawings contains much specificity, the details provided should not be construed as limiting the scope of the embodiment, but merely as providing illustrations of some of the features of the embodiment. The drawings and the description are not to be taken as restrictive on the scope of the embodiment and are understood as broad and general teachings in accordance with the present invention. While the present embodiment has been described using specific terms, such description is for illustrative purposes only, and it is to be understood that modifications and variations to such embodiment, including, but not limited to, the substitutions of equivalent features, materials, or parts, and the reversal of various features thereof, may be practiced by those of ordinary skill in the art without departing from the spirit and scope of the invention.

What is claimed is:

1. A knife housing, comprising:

a first housing portion having a stop extending from an inner surface of the first housing portion;

a second housing portion, the first housing portion and the second housing portion configured to be connected to each other defining a cavity therebetween;

an actuator arranged in the cavity, between the first housing portion and the second housing portion, the actuator, which is a monolithic structure, including an actuator body, a first spring formed integral with and extending directly from the actuator body and an opening extending within the actuator body;

a blade carrier including a carrier body arranged within the cavity, between the first housing portion and the second housing portion and extending from the opening of the actuator, the blade carrier, which is a monolithic structure, having a second spring formed integral with and extending directly from the carrier body; and a pawl rotatably fixed to the actuator, the stop configured to restrict forward movement of the actuator, the pawl and the blade carrier such that the actuator, the pawl and the blade carrier are prohibited from extending beyond the internal cavity formed by the first housing portion and the second housing portion.

2. The knife housing of claim 1, wherein the first body portion includes a plurality of projections that forms a first ramp and the second body portion includes a plurality of projections that forms a second ramp that is mirror opposite the first ramp.

3. The knife housing of claim 1, wherein the first body portion includes an extension that defines a stop which is configured to interact with the pawl.

4. The knife housing of claim 1, wherein the first spring and the second spring are extension springs.

5. The knife housing of claim 1, wherein the actuator, the blade carrier and the pawl are comprised of a plastic.

6. The knife housing of claim 1, wherein the blade carrier includes a first flange extending from a first outer periphery of the carrier body and second flange extending from a second outer periphery of the carrier body.

7. The knife housing of claim 1, wherein the blade carrier includes an elastically deformable protrusion that extends from the carrier body.

8. The knife housing of claim 7, further comprising a blade that is arranged between the first flange and the second flange of the blade carrier.

9. The knife housing of claim 1, wherein the blade carrier includes an elastically deformable protrusion extending therefrom that is configured to interact with the pawl.

10. The knife housing of claim 1, wherein the pawl includes a pawl body and a head extending from the pawl body, a first protrusion extending from the pawl head in a first direction, a second projection extending in a second direction that opposite the first direction from the pawl head and a hook-like projection extending from the pawl body.

11. The knife housing of claim 1, wherein the knife housing is constructed of at most six parts.

12. The knife housing of claim 1, wherein the actuator body includes a first sidewall, a second sidewall, a top wall extending between the first sidewall and the second sidewall and a bottom wall, spaced from the top wall and extending between the first sidewall and the second sidewall, the first sidewall, the second sidewall, the top wall and the bottom wall defining the opening in which the blade carrier is slidably arranged.

13. A method of using a knife, comprising:

providing a housing including a first housing portion having a stop extending from an inner surface of the first housing portion and a second housing portion, the first housing portion and the second housing portion defining a cavity therebetween, an actuator arranged within the cavity of the housing, the actuator, which is a monolithic structure, having an actuator body, a first spring formed integral with that extends from the actuator body and an opening extending within the actuator body, a blade carrier, which is a monolithic structure that includes a carrier body, arranged within the cavity and extending from the opening of the actuator and a second spring formed integral with and extending directly from the carrier body and a pawl fixed to the actuator and a button extending from the housing;

contacting the button extending from the knife;

pressing the button in a forward direction which in turn causes the actuator and the blade carrier along with a blade arranged on the blade carrier to move in the forward direction and the pawl to rotate;

continuing to press the button in the forward direction until the blade is extended out of the housing;

contacting a surface with the blade while continuing to press the button causing the blade to move to a fully extended position out of the housing with the stop preventing forward movement of the actuator, the pawl and the blade carrier such that the actuator, the pawl and the blade carrier are prevented by the stop from extending beyond the cavity formed between the first housing portion and the second housing portion;

cutting the surface, wherein the blade carrier retracts automatically from the fully extended position, entirely within the housing, to a rearward position entirely within the housing after cutting the surface with the button remaining depressed; and releasing pressure on the button and in turn actuator body.

14. The knife housing of claim 13, wherein the pawl extends the second spring and carries the second spring in the forward direction when pressing the button forward.

15. The knife housing of claim 13, wherein, when a cut to the surface is completed, the blade is held by friction and the second spring is disengaged from the pawl.

* * * * *